UNITED STATES PATENT OFFICE.

EDMOND BLANCHARD, OF GREENFIELD MILLS, MARYLAND.

IMPROVEMENT IN COMPOSTS.

Specification forming part of Letters Patent No. 24,988, dated August 9, 1859.

*To all whom it may concern:*

Be it known that I, EDMOND BLANCHARD, of Greenfield Mills, in the county of Frederick and State of Maryland, have invented a new and Improved Compost for Fertilizing Land; and I do hereby declare that the following is a full, clear, and exact statement of the ingredients of, process of manufacturing, and method of using, the same, and its properties and effects.

The ingredients and their several proportions, by measure, are as follows: lime, one hundred measures; common salt, (chloride of sodium,) fifty measures; wood-ashes, fifty measures; charcoal, fifty measures; wheat-bran, fifty measures; chimney-soot, fifty measures; plaster, (gypsum,) fifty measures.

The compost is made in the following manner: Under a shed or properly-supported roof, which will afford shelter from sun and rain, but permit a free circulation of air, a suitable hard even surface or floor is prepared by leveling and beating down the ground, and upon this floor is to be spread a layer of lime, and upon this layer of lime a layer of salt of about half the thickness, and these are to be sprinkled with a sufficient quantity of water to slake the lime. When the lime has been sufficiently moistened throughout another layer of lime is to be spread over the first layers of lime and salt, and then another layer of salt; and these are to be sprinkled, as before, with water. These layers may be repeated one upon another and treated in the same manner till the hundred (100) measures of lime and fifty (50) measures of salt are all used up, and the lime and salt are then to remain for about fifteen (15) or twenty (20) days, or even a month, without being disturbed, after which they are to be turned over onto another part of the ground or floor, or onto another floor prepared in a similar manner, upon which they are spread in layers as at first, and sprinkled with water between the several layers for the purpose of moistening any portions of the lime which failed to be slaked in the first operation. After having remained here undisturbed for about the same period of time as before mentioned they are to be again turned over in layers back to the place on which they were first spread, and the same treatment as before is to be repeated throughout; and after they have again remained undisturbed for about fifteen (15) or twenty (20) days the lime and salt will have become pretty thoroughly combined in the state of carbonate of soda. The other ingredients, which should all be in a state of powder, are then to be added, and the whole to be mixed together without the addition of any more water. The compost now only requires sifting to take out any lumps, and it is ready to be applied to the land by a drill, or by any suitable means.

This compost possesses all the essential properties that the soil requires for the raising of wheat and other cereals, and an experiment made with it and Peruvian guano, side by side, in raising wheat, has proved that, while its cost is but about one-fourth that of the guano, it will produce a far heavier crop.

I claim none of the ingredients herein named, when taken separately, nor when used or mixed otherwise than in the proportions herein described; but

Having thus described my invention, I claim and desire to secure by Letters Patent—

As an improved article of manufacture, a fertilizing compost composed of lime, chloride of sodium, wood-ashes, charcoal, wheat-bran, chimney-soot, and gypsum, combined in the proportions and manner herein described.

EDMOND BLANCHARD.

Witnesses:
ELIAS SPALDING,
WM. H. MOORE.